April 28, 1970     W. W. RICE, JR     3,509,371
PEAK FOLLOWER AND MEMORY
Filed Dec. 15, 1966
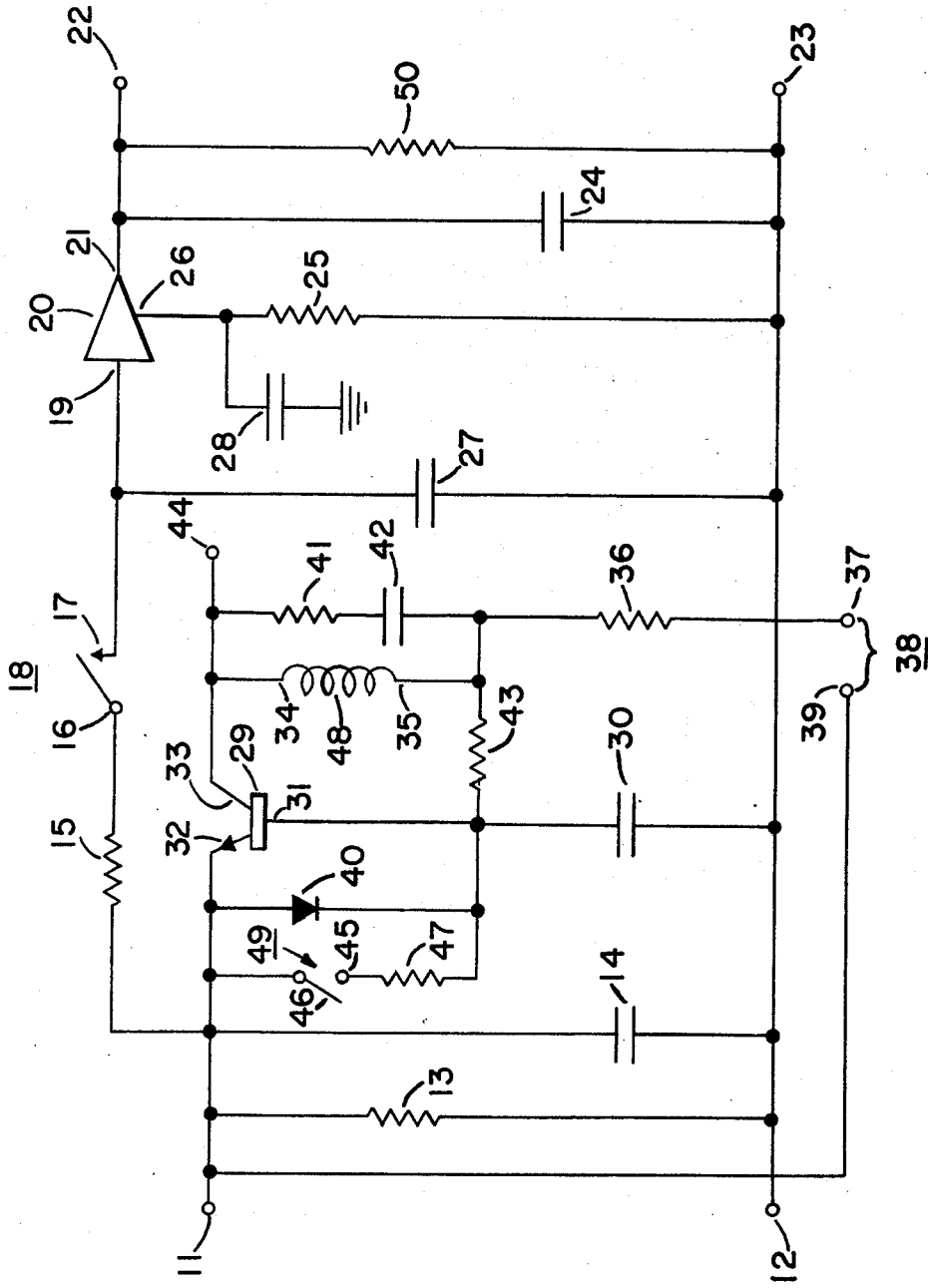
INVENTOR.
WILLARD W. RICE JR.
BY David E. Hype
ATTORNEY

3,509,371
PEAK FOLLOWER AND MEMORY

Willard W. Rice, Jr., Foxboro, Mass., assignor to The Foxboro Company, Foxboro, Mass., a corporation of Massachusetts
Filed Dec. 15, 1966, Ser. No. 601,882
Int. Cl. G06g 7/12; H03k 5/13
U.S. Cl. 307—233                  5 Claims

ABSTRACT OF THE DISCLOSURE

This invention provides means for transferring the amplitude of an input electrical signal, while it is increasing, to a level retaining means, with said transferring means allowing the peak value of said amplitude to be retained until such time as said amplitude is again increasing.

---

In chromatographic applications, the output signal from the chromatographic analyzer typically consists of a time-based series of peaks. For controlling purposes, it is frequently desirable to monitor the particular peak representing a measured variable, and to control another variable in the process in accordance therewith. For the purpose of continuous control, a means of registering the amplitude of the peak in question over a period of time is required.

To facilitate these and other functions apparent from the description below, the invention includes an input signal sensing circuit which actuates a relay while the input signal is increasing at or above a predetermined rate; the actuated relay thereupon transfers the input signal to an amplifier having a high input impedance and operated as a memory device. Provision is made in the alternative to actuate the relay by an external programming source. By this alternative means, the variable signal from one memory device may be transferred at predetermined times to a second programmed memory device, whereby the output of the second memory device furnishes a long time-constant representation of the changes in peak amplitudes, in the form of a stepped signal. A first memory output may supply signals representing sequential peaks, each to one of a plurality of programmed memory devices, whereby each of the programmed devices represents one component of a chromatographic analysis.

The sole figure is aschematic of an embodiment of the invention, performing peak following and memory functions.

Referring to the figure, the input signal is connected to terminals 11 and 12, with terminal 11 for receiving the negative polarity of signal as compared with terminal 12. The input signal is processed or normalized to be in the range of from 10–50 milliamperes, this being a standard signal transfer range for currents. Precision resistor 13 and electrolytic capacitor 14 are connected across terminals 11 and 12. Resistor 13 is a low impedance, illustratively 100 ohms. Capacitor 14 is conveniently 100 microfarads, having the purpose of smoothing random variations in the input signal. Terminal 11 is connected through resistor 15 and contacts 16 and 17 of relay 18 to input 19 of high-impedance amplifier 20. Output 21 of amplifier 20 is connected to output terminal 22. Output terminal 23 is connected back to input terminal 12. Output terminal 22 is positive with respect to output terminal 23. Capacitor 24 is connected between terminals 22 and 23 for filtering purposes. Precision resistor 25, conveniently 100 ohms, being the same impedance as precision resistor 13, is connected between output terminal 23 and common reference 26 of amplifier 20.

Precision resistors R13 and R25 are electrically connected in series between input terminal 11 and common reference 26 of amplifier 20. In operation, output 21 of amplifier 20 will provide sufficient current to load 50 through output terminals 22 and 23 and through resistor 25, so that the potential drop across precision resistor 25 is equal and opposite to the potential drop across input resistor 13, caused by the input current flowing through resistor 13. In this manner, the effective signal between input 19 and common reference 26 of amplifier 20 is effectively nulled. The accuracy of reproduction at output terminals 22 and 23 of the input current supplied to terminal 11 and 12 depends upon the matching of precision resistor 25 with precision resistor 13. Capacitor 27 is connected between input terminal 19 of amplifier 20 and output terminal 23, thereby providing means for storing the last-received value of the input signal during such times as contacts 16 and 17 of relay 18 are open. When contacts 16 and 17 of relay 18 are closed, capacitor 27 is charged through resistor 15 by the current supplied to terminals 11 and 12. Resistor 15 is illustratively 1000 ohms. Thus, this charging circuit has a low time constant. When contacts 16 and 17 of relay 18 are open, capacitor 27 must discharge through the high input impedance of amplifier 20; thus capacitor 27 holds its charge over a long time in this condition.

Relay 18 is controlled by a rate-sensing section including transistor 29. Input terminal 12 is connected through electrolytic capacitor 30 to base 31 of transistor 29. Input terminal 11 is connected to the emitter 32 of transistor 29. Collector 33 of transistor 29 is connected to one end 34 of coil 48 of relay 18. The other end 35 of coil 48 is connected through resistor 36 to the positive side 37 of relay-energizing power supply 38. The negative side 39 of power supply 38 is connected to input terminal 11. The cathode of diode 40 is connected to the base of transistor 29 and its anode is connected to the emitter of transistor 29.

A resistance 41 and a capacitor 42 are serially connected across coil 48 for purposes of spike suppression. Resistor 43 is connected between base 31 of transistor 29 and end 35 of coil 48 for purposes of setting the non-actuated quiescent current through coil 48.

In operation, the beginning slope of an input signal causes terminal 12 to become increasingly positive, and this increasingly positive potential is coupled through capacitor 30 to the base of transistor 29. If the rate of increase of the input signal is higher than a predetermined minimum determined by the time constant of the base circuit of transistor 29, the potential upon the base of 31 of transistor 29 will become sufficiently positive to make transistor 29 forward-conducting. When this happens coil 48 of relay 18 is energized by current from power supply 38 flowing through resistor 36, coil 48 and the collector-emitter path of transistor 29 back to negative terminal 39 of power supply 38.

While relay 18 is energized, amplifier 20 will provide output current through output terminals 22 and 23 equal to the current flowing through resistor 13, in order to produce the negative feedback voltage across resistor 25 to null the input to amplifier 20. Whatever input signal is dropped across resistor 13 is repeated across resistor 25 until such time as relay 18 is de-energized. Relay 18 is de-energized when the input signal rate of increase tapers off so that signal transfer through capacitor 30 is not sufficient to maintain base 31 sufficiently positive to make transistor 29 conduct. Circuit parameters are chosen so that relay 18 is de-energized very nearly at the time the input signal reaches its peak. Thereafter, the input signal peak is effectively stored as a charge on capacitor 27.

Diode 40 provides a means of discharging capacitor 30 when the input signal returns to zero. Owing to the forward resistance of diode 40, complete discharge is never effected therethrough, but sufficient discharge of capacitor 30 is obtained for most applications. Should it be desired to completely discharge capacitor 30 during intervals between peaks, external programming means may provide a switch closure between terminal 11 and base 31 with resistor 47 serially connected therein to limit the discharge current.

The circuit discussed may be conveniently converted from the function described to a memory function by disconnecting negative terminal 39 of relay energizing power supply from input terminal 11. External programming means are used to energize relay 18, conveniently by switching the disconnected terminal 39 to end 34 of coil 48. Thereby, capacitor 27 and amplifier 20 lock up the input signal at terminals 11 and 12 whenever such actuation of relay 18 is momentarily made, and until such actuation is repeated.

While there has been shown what is considered to be a preferred embodiment of the invention, it will be manifest that many changes and modifications may be made therein without departing from the essential spirit of the invention. It is intended,, therefore, in the annexed claims to cover all such changes and modifications as fall within the true scope of the invention.

What is claimed is:

1. Electrical apparatus for retaining the amplitude of an electrical signal comprising:

input terminals responsive to said electrical signal, signal switching means having an input responsive to said electrical signal and being actuatable by energizing means whereby said input of said signal switching means is switched to the output thereof when said signal switching means in an actuated condition, signal level retaining means having an input responsive to said output of said signal switching means and having an output signal corresponding to the last signal level received at said input of said signal level retaining means and including an amplifier having a high input impedance, and including a capacitor interconnected with the input of said high impedance amplifier for providing storage means for the signal supplied thereto from said input terminals through a low impedance path including said signal switching means and with the discharge path of said capacitor including said high input impedance of said amplifier whereby the output of said amplifier remains substantially constant over a relatively long period while the input of said amplifier is maintained by said capacitor, negative feedback means including said switching means interconnected between said output and said input of said signal level retaining means, rate detecting means interconnected with said input terminals for determining the rate of change of said electrical signal and having an energizing output for actuating said signal switching means, and output terminals interconnected with said output of said signal level retaining means.

2. The apparatus of claim 1 wherein said energizing output of said rate detecting means is sufficient to actuate said signal switching means while said input signal increases at or faster than a predetermined rate.

3. The apparatus of claim 1 wherein a first resistance connected across said input terminals is equal to a second resistance included in said negative feedback means and connected serially with said output terminals, whereby an output current flowing through said second resistance creates a potential drop equal and opposite to the potential drop across said first resistance when said output current flow through said second resistance is equal to said input current flow through said first resistance.

4. The apparatus of claim 3 wherein said second resistance is connected serially with said output terminals, and said amplifier output.

5. The apparatus of claim 3 wherein a capacitor is interconnected with the input of said high impedance amplifier for providing storage means for the signal supplied thereto by said signal switching means with a charging path for said capacitor having a low impedance being from said input terminals through said signal switching means and with the discharging path for said capacitor having a high impedance being through the high input impedance of said amplifier.

References Cited

UNITED STATES PATENTS

| | | | |
|---|---|---|---|
| 3,045,183 | 7/1962 | Laczko | 328—151 |
| 3,064,165 | 11/1962 | Kennedy | 328—67 |
| 3,119,070 | 1/1964 | Seliger | 328—132 |
| 3,127,565 | 3/1964 | Williams | 328—127 |
| 3,249,925 | 5/1966 | Single et al. | 328—127 |
| 3,313,924 | 4/1967 | Schulz et al. | 328—128 |
| 3,381,231 | 4/1968 | Gilbert | 328—151 |

JOHN S. HEYMAN, Primary Examiner

H. A. DIXON, Assistant Examiner

U.S. Cl. X.R.

307—229; 328—114